United States Patent
Shin et al.

(10) Patent No.: US 12,260,188 B2
(45) Date of Patent: Mar. 25, 2025

(54) POP COUNT-BASED DEEP LEARNING NEURAL NETWORK COMPUTATION METHOD, MULTIPLY ACCUMULATOR AND DEVICE

(71) Applicant: KOREA ELECTRONICS TECHNOLOGY INSTITUTE, Seongnam-si (KR)

(72) Inventors: Dong Yeob Shin, Seoul (KR); Tae Beom Lim, Yongin-si (KR); Yong Seok Lim, Seoul (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 1092 days.

(21) Appl. No.: 17/254,254

(22) PCT Filed: Nov. 30, 2020

(86) PCT No.: PCT/KR2020/017253
§ 371 (c)(1),
(2) Date: Dec. 18, 2020

(87) PCT Pub. No.: WO2022/080579
PCT Pub. Date: Apr. 21, 2022

(65) Prior Publication Data
US 2022/0317973 A1 Oct. 6, 2022

(30) Foreign Application Priority Data

Oct. 14, 2020 (KR) .................. 10-2020-0132847
Nov. 30, 2020 (KR) .................. 10-2020-0163708

(51) Int. Cl.
G06F 7/544 (2006.01)
G06F 1/03 (2006.01)

(52) U.S. Cl.
CPC .............. *G06F 7/5443* (2013.01); *G06F 1/03* (2013.01)

(58) Field of Classification Search
CPC ......... G06F 7/5443; G06F 7/523–5235; G06F 7/533; G06F 2207/481; G06F 2207/3816–382; G06F 2207/3832
See application file for complete search history.

(56) References Cited

U.S. PATENT DOCUMENTS

2017/0351781 A1  12/2017  Alexander et al.
2018/0308009 A1  10/2018  Bunch et al.
(Continued)

FOREIGN PATENT DOCUMENTS

GB        2586642 A  *  3/2021  ........... G06F 7/5443
KR  10-2019-0127233 A     11/2019
(Continued)

*Primary Examiner* — Matthew D Sandifer
(74) *Attorney, Agent, or Firm* — NSIP Law

(57) ABSTRACT

The present invention relates to a pop count-based deep learning neural network computation method, a multiply accumulator, and a device thereof. The computation method according to an exemplary embodiment of the present invention is a computation method for a deep learning neural network, including a step of generating one-hot encoding codes according to the type of first multiplication result values for a multiplication (first multiplication) of weights (W) and input values (A); a step of performing a pop-count for each generated code; and a step of accumulating result values for a constant multiplication (second multiplication) between each type of the first multiplication result value and each count value of the pop-count which are different constant values.

20 Claims, 17 Drawing Sheets

(56) References Cited

U.S. PATENT DOCUMENTS

2020/0267182 A1     8/2020  Highnam et al.
2021/0125046 A1*    4/2021  Moshovos ............. G06N 3/045

FOREIGN PATENT DOCUMENTS

KR    10-2020-0121497 A    10/2020
WO    WO 2019/213745 A1    11/2019

* cited by examiner

| | INPUT OPERANDS | ACCUMULATOR | TOPS | X-factor vs. FFMA | SPARSE TOPS | SPARSE X-factor vs. FFMA |
|---|---|---|---|---|---|---|
| V100 | FP32 | FP32 | 15.7 | 1x | - | - |
| | FP16 | FP32 | 125 | 8x | - | - |
| A100 | FP32 | FP32 | 19.5 | 1x | - | - |
| | TF32 | FP32 | 156 | 8x | 312 | 16x |
| | FP16 | FP32 | 312 | 16x | 624 | 32x |
| | BF16 | FP32 | 312 | 16x | 624 | 32x |
| | FP16 | FP16 | 312 | 16x | 624 | 32x |
| | INT8 | INT32 | 624 | 32x | 1248 | 64x |
| | INT4 | INT32 | 1248 | 64x | 2496 | 128x |
| | BINARY | INT32 | 4992 | 256x | - | - |
| | IEEE FP64 | | 19.5 | 1x | - | - |

FIG. 4

POP COUNT-BASED DEEP LEARNING NEURAL NETWORK COMPUTATION METHOD, MULTIPLY ACCUMULATOR AND DEVICE

CROSS REFERENCE TO RELATED APPLICATIONS

This application is a U.S. National Stage Application of International Application No. PCT/KR2020/017253, filed on Nov. 30, 2020, which claims the benefit under 35 USC 119(a) and 365(b) of Korean Patent Application No. 10-2020-0132847, filed on Oct. 14, 2020, in the Korean Intellectual Property Office, and Korean Patent Application No. 10-2020-0163708, filed on Nov. 30, 2020, the entire disclosure of which is incorporated herein by reference for all purposes.

TECHNICAL FIELD

The present invention relates to a pop count-based deep learning neural network computation method, a multiply accumulator, and a device thereof, and more specifically, the present invention relates to a method of processing a computation for a deep learning neural network such as a deep neural network (DNN) and the like based on a pop-count, a multiply accumulator, and a device thereof.

BACKGROUND ART

A deep learning neural network such as a deep neural network (DNN) and the like is an artificial neural network (ANN) consisting of several hidden layers between an input layer and an output layer. In this case, the deep learning neural network can model complex non-linear relationships similar to a general artificial neural network.

Such a deep learning neural network consumes a lot of energy and time during hardware operation due to a large number of parameters and amount of computation, and a method of lowering the bit-precision of computation is used to reduce the same. In particular, computation for a deep learning neural network is a repetition of a multiply-accumulate operation that accumulates a number of numerous multiplication results in detail. In this case, as the bit-precision decreases, the types of multiplication result values decrease, and a phenomenon occurs in which more multiplication results having the same value are accumulated.

In the case of the conventional technology, since the multiplication operation is simply performed repeatedly without considering the repetition of such multiplications having the same result value, there is a problem in that it is very inefficient in terms of power efficiency of hardware.
(Related Art) KR10-2020-0121497 A

DISCLOSURE

Technical Problem

In order to solve the problems of the conventional technology as described above, the present invention is directed to providing a technique for processing an operation for a deep learning neural network with low bit-precision based on a pop-count.

However, the problems to be solved by the present invention are not limited to the problem mentioned above, and other problems that are not mentioned can be clearly understood by those of ordinary skill in the art to which the present invention pertains from the following description.

Technical Solution

In order to solve the above problems, the computation method according to an exemplary embodiment of the present invention is a computation method for a deep learning neural network, including a step of generating one-hot encoding codes according to the type of first multiplication result values for a multiplication (first multiplication) of weights (W) and input values (A); a step of performing a pop-count for each generated code; and a step of accumulating result values for a constant multiplication (second multiplication) between each type of the first multiplication result value and each count value of the pop-count which are different constant values.

The step of accumulating may include a first deriving step of deriving the second multiplication result values; and a second deriving step of deriving an accumulated result value for the second multiplication result values.

The first deriving step may include a step of using a constant multiplier that performs a multiplication operation between the constant value and the count value, or a step of using a shifter that performs a shift for a bit of the constant value.

The first deriving step may include a step of using a lookup table in which the second multiplication result values are stored.

The second deriving step may include a step of using an adder tree that performs an accumulation operation between the second multiplication result values.

The step of accumulating may include a step of performing distributed arithmetic based on a lookup table in which the second multiplication result values are stored.

The step of generating may include a step of generating the code by classifying the type of the first multiplication result value according to the bit type of the weight and the input value.

The step of generating may include a first classifying step of classifying whether the result value is 0 (zero) for the first multiplication; a second classifying step of classifying the type of the remaining result value for each first multiplication wherein the result value is classified to be not 0 (non-zero); and a step of generating the code based on the classified result in the second classifying step.

The second classifying step may include a second-1 classifying step of classifying the type of the result value into two groups based on the most significant bit of the weight and the input value for each first multiplication classified as the non-zero; and a second-2 classifying step of classifying the type of the result value for the first multiplication belonging to each group for the two groups.

The computation method according to an exemplary embodiment of the present invention may further include a step of classifying the type of each first multiplication result value into a plurality of data according to a repetition probability; a first operating step of applying the step of generating, the step of performing, and the step of accumulating for the first multiplication belonging to first data, respectively; a second operating step of performing a multiply-accumulate operation different from the first operating step, for the first multiplication belonging to second data having a lower repetition probability than the first data; and a third operating step of accumulating the result values of the first operating step and the second operating step.

The multiply accumulator according to an exemplary embodiment of the present invention is a multiply accumulator applied to a deep learning neural network operation, including an encoder for generating one-hot encoding codes according to the type of first multiplication result values for multiplications (first multiplication) between weights (W) and input values (A), respectively; a pop counter for performing a pop-count for each generated code; and a multiply-accumulate operation unit for accumulating constant multiplication (second multiplication) result values between each type of the first multiplication result value and each count value of the pop-count which are different constant values.

The multiply-accumulate operation unit may derive the second multiplication result value based on a constant multiplier that performs a multiplication operation between the constant value and the count value, or a shifter that performs a shift for a bit of the constant value.

The multiply-accumulate operation unit may derive the second multiplication result values based on a lookup table in which the second multiplication result values are stored.

The multiply-accumulate operation unit may accumulate the second multiplication result values based on an adder tree that performs an accumulation operation between the second multiplication result values.

The multiply-accumulate operation unit may accumulate the second multiplication result values by performing distributed arithmetic based on a lookup table in which the second multiplication result value is stored.

The encoder may generate the code by classifying the type of the first multiplication result value according to the bit type of the weight and the input value.

The encoder may firstly classify whether the result value is 0 (zero) for each first multiplication, secondly classify the type of the result value for each first multiplication whose result value is classified to be not 0 (non-zero), and generate the code based on the secondly classified result.

The encoder may classify the type of the result value into two groups based on the most significant bit of the weight and the input value for each first multiplication that is classified to be the non-zero while secondly classifying, and then classify the type of the result value for the first multiplication belonging to each group for the two groups.

The multiply accumulator according to an exemplary embodiment of the present invention may further include a first operation unit for including the encoder, the pop counter, and the multiply-accumulate operation unit, respectively, and processing the first multiplication belonging to first data; a second operation unit for performing a multiply-accumulate operation different from that of the first operation unit for the first multiplication belonging to second data having a lower repetition probability than the first data; and a third operation unit for accumulating the result values of the first operation unit and the second operation unit.

The electronic device according to an exemplary embodiment of the present invention is an electronic device performing an operation of a deep learning neural network, including a memory for storing weights (W) of the deep learning neural network and input values (A) that are input to an input layer of the deep learning neural network; and a multiply-accumulator for calculating an accumulated result value for multiplications (first multiplication) between the weights and the input values that are stored in the memory.

The multiply-accumulator may generate one-hot encoding codes according to the type of first multiplication result values for the first multiplications, respectively, perform a pop-count for each generated code, and accumulate constant multiplication (second multiplication) result values between each type of the first multiplication result value and each count value of the pop-count which are different constant values.

Advantageous Effects

The present invention constituted as described above converts multiplications having the same result values that are accumulated in a large amount in operations for a deep learning neural network such as a deep neural network and the like with low bit-precision into a pop count operation and a constant multiplication, thereby improving processing speed, and there is an advantage that the area and power consumption of the hardware can be significantly reduced.

The present invention has an advantage that it can be applied to various hardware such as mobile devices, edge devices, servers, and the like that process deep learning neural network operations.

The effects that can be obtained in the present invention are not limited to the above-mentioned effects, and other effects not mentioned can be clearly understood by those of ordinary skill in the art to which the present invention pertains from the following description.

DESCRIPTION OF DRAWINGS

FIG. 4 shows an example of the performance comparison of tera operations per second (TOPS) according to the bit-precision of input data.

[Explanation of Reference Numerals]

Figure 1:
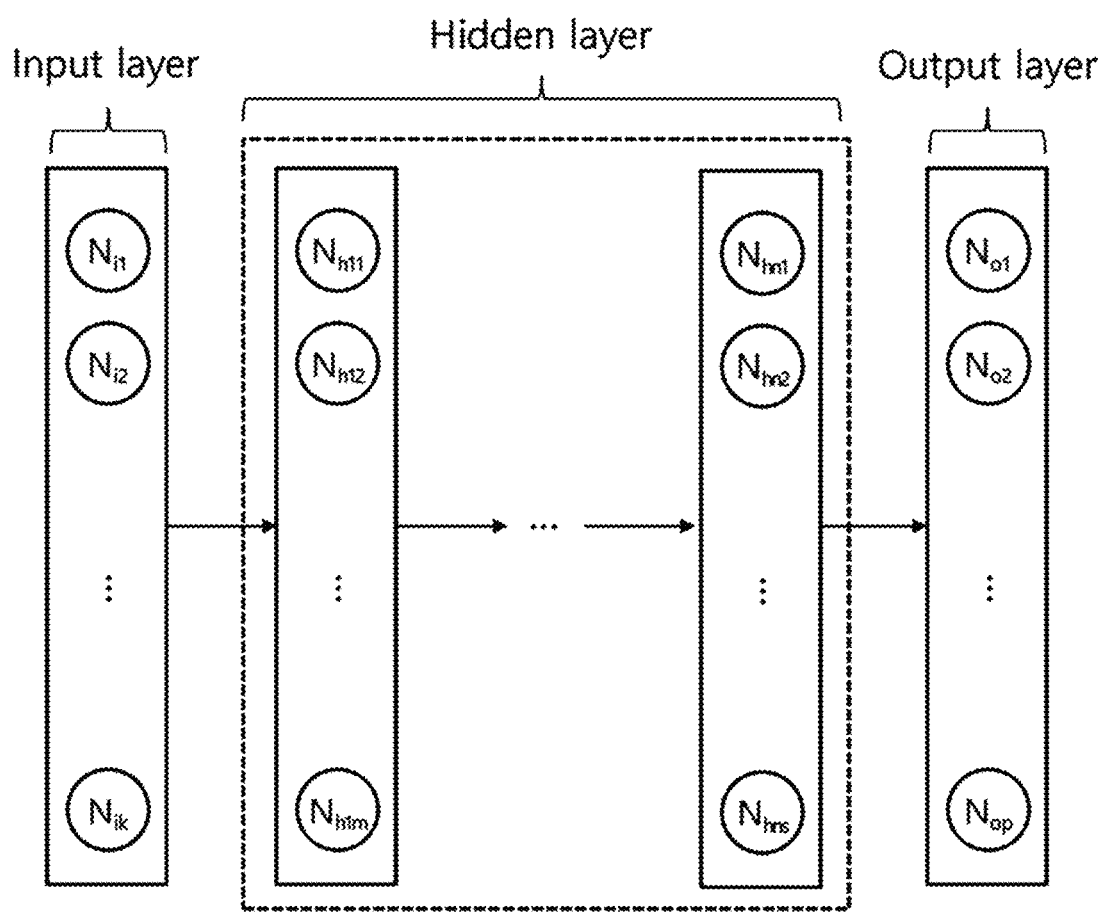
FIG. 1 shows an example of a configuration of a deep learning neural network.

| | |
|---|---|
| 1: Electronic device | 10: Neural network processing unit |
| 11: Multiply accumulator | 12: Buffer |
| 20: Input unit | 30: Communication unit |
| 40: Memory | 50: Control unit |
| 100: First operation unit | 110: Encoder |
| 120: Pop counter | 130: Multiply-accumulate operation unit |
| 131: Constant multiplier | 132: Shifter |
| 133: Adder tree | 134: Lookup table |
| 200: Second operation unit | 300: Third operation unit |

MODES OF THE INVENTION

The above objects and means of the present invention and effects thereof will become more apparent from the following detailed description taken in conjunction with the accompanying drawings, and accordingly, those having ordinary skill in the art to which the present invention pertains may easily practice the technical spirit of the present invention. In addition, in describing the present invention, when it is determined that the detailed description of the known technology related to the present invention may unnecessarily obscure the gist of the present invention, the detailed description thereof will be omitted.

The terminology as used herein is for the purpose of describing exemplary embodiments only and is not intended to be limiting the invention. In the present specification, the singular forms also include the plural forms unless the case otherwise indicates. In the present specification, terms such as "comprise", "include", "prepare", "have", or the like do not exclude the presence or addition of one or more other components than the components mentioned.

In the present specification, terms such as "or". "at least one", and the like may refer to one of the words listed together, or may represent a combination of two or more. For example, "A or B" and "at least one of A and B" may include only one of A or B, and may include both A and B.

In the present specification, descriptions that follow "for example" and the like may not exactly match the information presented, such as the recited characteristics, variables, or values, and the exemplary embodiments of the present invention according to various examples of the present invention should not be limited to effects such as variations including tolerance errors, measurement errors, limits of measurement accuracy, and other commonly known factors.

In the present specification, when a component is described as being 'connected' or 'joined' to another component, it should be understood that it may be directly connected to or joined to the other component, but another component may be present therebetween. On the other hand, when a component is mentioned to be 'directly connected' or 'directly joined' to another component, it should be understood that there is no other component therebetween.

In the present specification, when a component is described as being 'on' or 'in contact' another component, it should be understood that the component may be directly in contact with or connected to another component, but another component may be present therebetween. On the other hand, when a component is described as being 'directly on' or 'directly in contact' with another component, it may be understood that there is no other component therebetween. Other expressions describing the relationship between the components, such as 'between' and 'directly between', may be interpreted in the same manner.

In the present specification, terms such as 'first', 'second', and the like may be used to describe various components, but the components should not be limited by the above terms. In addition, the above terms should not be construed as limiting the order of each component, but may be used for the purpose of distinguishing one component from another. For example, a 'first component' may be referred to as a 'second component', and similarly, a 'second component' may also be referred to as a 'first component'.

Unless otherwise defined, all terms used in the present specification may be used in a sense that can be commonly understood by those of ordinary skill in the art to which the present invention pertains. In addition, terms that are defined in a commonly used dictionary are not ideally or excessively interpreted unless they are specifically defined clearly.

Hereinafter, preferred exemplary embodiments according to the present invention will be described in detail with reference to the accompanying drawings.

FIG. 1 shows an example of a configuration of a deep learning neural network.

As illustrated in FIG. 1, a deep learning neural network is an artificial neural network (ANN) including a plurality of hidden layers (i.e., hidden layers of the number of n) (where n is a natural number of 2 or more) between an input layer and an output layer. Such a deep learning neural network may be modeled by learning various non-linear relationships between an input layer and an output layer through a plurality of hidden layers.

In this case, the input layer, the plurality of hidden layers, and the output layer each include a plurality of nodes (N), respectively. For example, as illustrated in FIG. 1, the input layer may include nodes of $N_{i1}, \ldots N_{ik}$ (where k is a natural number of 2 or more), the first hidden layer may include nodes of $N_{h11}, \ldots N_{h1m}$ (where m is a natural number of 2 or more), the $n^{th}$ hidden layer may include nodes of $N_{hn1}, \ldots N_{hns}$ (where n and s are natural numbers of 2 or more), and the output layer may include nodes of $N_{o1}, \ldots N_{op}$ (where p is a natural number of 2 or more).

Figure 2:
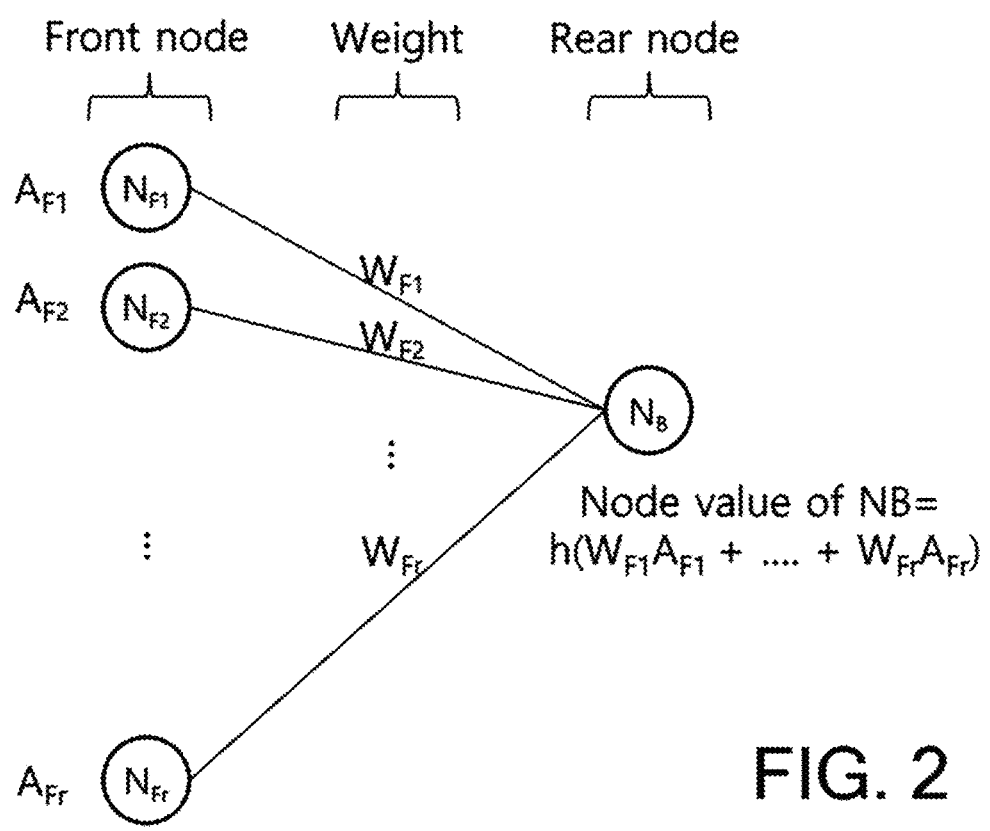
FIG. 2 shows an example of a connection relationship between a plurality of nodes of a layer (front layer) positioned at a front end and any one node of a layer (rear layer) positioned at a rear end in a deep learning neural network.

FIG. 2 shows an example of a connection relationship between a plurality of nodes of a layer (front layer) positioned at a front end and any one node of a layer (rear layer) positioned at a rear end in a deep learning neural network. In addition, FIG. 3 shows an example of a connection relationship between a plurality of nodes of an input layer and any one node of a first hidden layer in a deep learning neural network.

In a deep learning neural network, nodes in a front layer (front node) are connected to nodes in a rear layer (rear node) in various ways. In this case, each node has a weight (W), and the node value of each rear node may be determined by the node value and weight of the front node connected thereto.

That is, referring to FIG. 2, a plurality of front nodes $(N_{F1}, \ldots N_{Fr})$ (where r is a natural number of 2 or more) are connected to at least one rear node $(N_B)$. In this case, for $N_{F1}, \ldots N_{Fr}$ which are front nodes, respectively, when each node value (i.e., input value) (activation) is $A_{F1}, \ldots A_{Fr}$, and each weight is $W_{F1}, \ldots W_{Fr}$, the node value of the rear node $(N_B)$ is $h(W_{F1}A_{F1}+ \ldots +W_{Fr}A_{Fr})$. Herein, h is an activation function and may be, for example, a hyperbolic tangent function, a sigmoid function, an ReLU function, and the like, but is not limited thereto.

Figure 3:
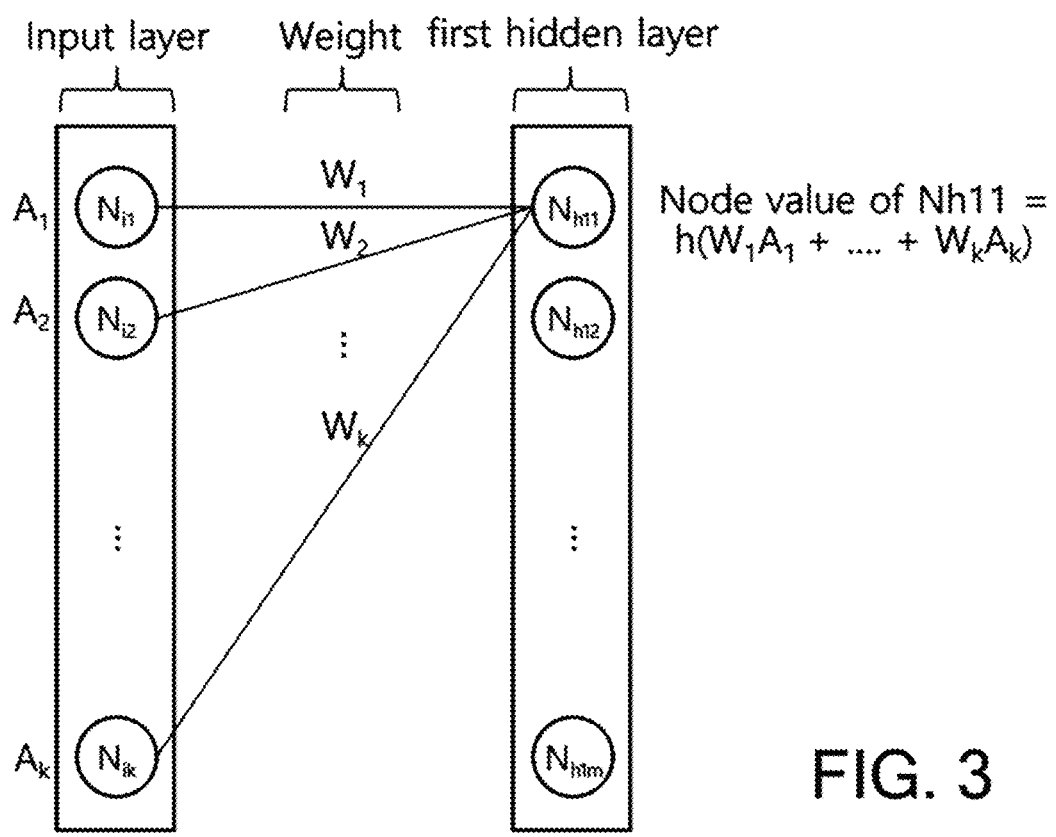
FIG. 3 shows an example of a connection relationship between a plurality of nodes of an input layer and any one node of a first hidden layer in a deep learning neural network.

For example, as illustrated in FIG. 3, input values (activation) of $A_1, \ldots A_k$ are input to $N_{i1}, \ldots N_{ik}$ which are each node of the input layer, and if the weight of each input node is $W_1, \ldots W_K$, the node value of $N_{h11}$ of the first hidden layer is $h(W_1A_1 + \ldots + W_kA_k)$.

Such deep learning neural network operation shows high accuracy in applications in various fields through numerous operations. However, since a deep learning neural network conventionally has several millions to billions of parameters and computation amounts, it consumes a lot of power and energy and has a long processing time when implementing hardware. Accordingly, in order to effectively reduce the parameter storage space and the computation amount, a method of reducing the bit-precision of input data, that is, a method of reducing the number of bits of allocated data for each input value is used. In this case, input data is data input to each layer in the deep learning neural network, and in particular, it may be data input to each rear layer of the deep learning neural network. That is, the input data for one rear node includes an input value (activation; A), which is a node value of a front node connected thereto, and a weight (W) of the front node connected thereto.

If the bit-precision of input data is reduced by half, the power and energy of the hardware consumed for the same operation may be reduced to about ¼. Particularly, in the case of inference operation, it is often operated on mobile or edge devices, and since it requires lower bit-precision than learning operations, various methods of lowering such bit-precision are becoming common.

For deep learning neural network operation, as illustrated in FIGS. 2 and 3, a multiply-accumulate operation between input values (A) and weights (W) (i.e., a multiplication operation for input values and weights, and an operation of accumulating the multiplication result values) is performed, and in this case, the largest overhead of the overall operation is a multiplication operation. However, as the bit-precision decreases, a phenomenon occurs in which multiplication operations having the same result value are frequently repeated. In particular, since the input values and the weight values for multiplication have a normal distribution (particularly, in the case of weights) and a half-normal distribution (particularly, in the case of input values), not uniform distribution, the repetition phenomenon of multiplications having the same result value becomes more severe.

At high bit-precision, a multiply-accumulate operation is efficient because there are many types of multiplication result values, and thus, even if there is an effect of normal distribution/half-normal distribution, multiplications having the same result value are not repeated many times in terms of probability. However, at low bit-precision, multiplications having the same result value are repeated much more often. Accordingly, when a multiplication operation is performed for all multiplications as in the conventional technology, most of the power and energy are consumed in repetitive operations for multiplications having the same result value. At such low-bit precision, a new computation method is required that can increase the power efficiency of hardware by replacing repetition of multiplication operations having the same result value.

FIG. 4 shows an example of the performance comparison of tera operations per second (TOPS) according to the bit-precision of input data.

The bit-precision of a deep learning neural network operation may generally be expressed as the bit-precision of input data. Referring to FIG. 4, it is possible to compare the operation processing speed (TOPS) performance of GPU according to the bit-precision change of input data. The A100 GPU is NVIDIA's latest GPU model and is a GPU dedicated to deep learning neural network processing. In the case of A100, unlike the previous version of V100, it supports a much lower bit-precision input data type than floating-point 32-bit (FP32) or 16-bit (FP16) that were initially used, such as integer 8-bi (INT8), integer 4-bit (INT4), integer 1-bit (BINARY), and the like. In the case of integer 4-bit operation, it represents a 1,248-times increase in the operation processing speed in the same GPU compared to floating-point 32-bit operations.

Figure 5:
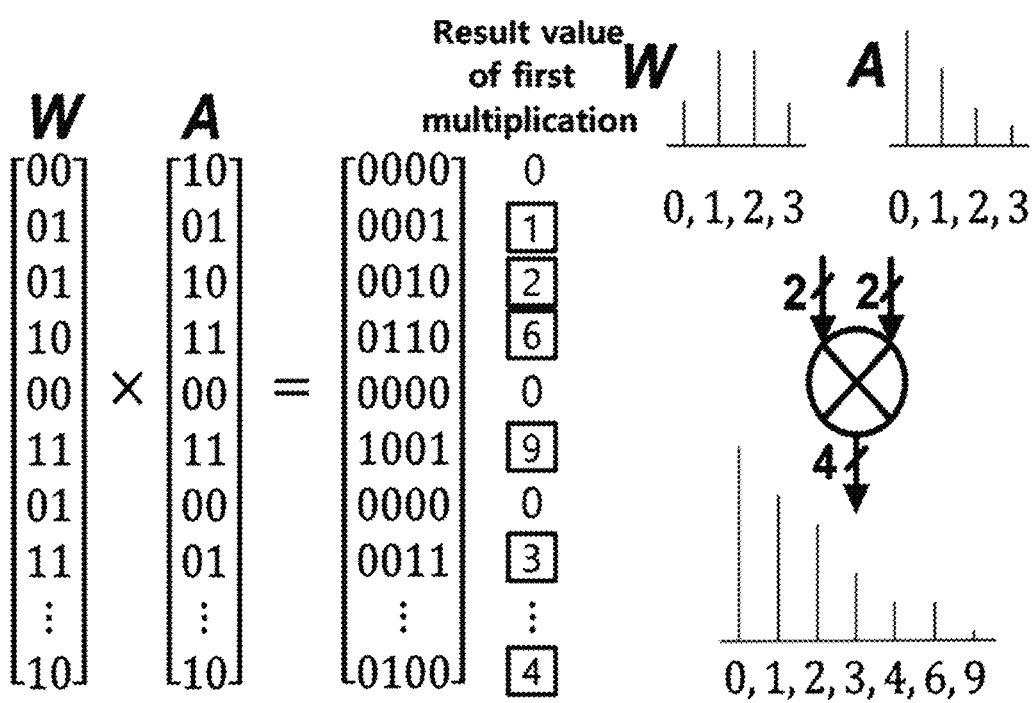
FIG. 5 shows an example of a conceptual diagram of a probability distribution of input data and a probability distribution of a multiplication operation result at low bit-precision (2-bit).

FIG. 5 shows an example of a conceptual diagram of a probability distribution of input data and a probability distribution of a multiplication operation result at low bit-precision (2-bit).

Referring to FIG. 5, a probability distribution of input data and a probability distribution of a multiplication operation result at a low bit-precision of 2-bit may be known. In this case, there are 7 types of multiplication result values, 0, 1, 2, 3, 4, 6, and 9, and as the multiplication result value according to the input data distribution is a smaller type (i.e., in the order of 9, 6, 4, 3, 2, 1, and 0), the probability of its repetition becomes larger. That is, in each layer of a deep learning neural network, the weight (W) of input data has a normal distribution, and the input value (A) has a half-normal distribution. Due to such distributions, multiplications belonging to a type having a small multiplication result value such as 0, 1, 2, and 3 are frequently repeated.

Figure 6:
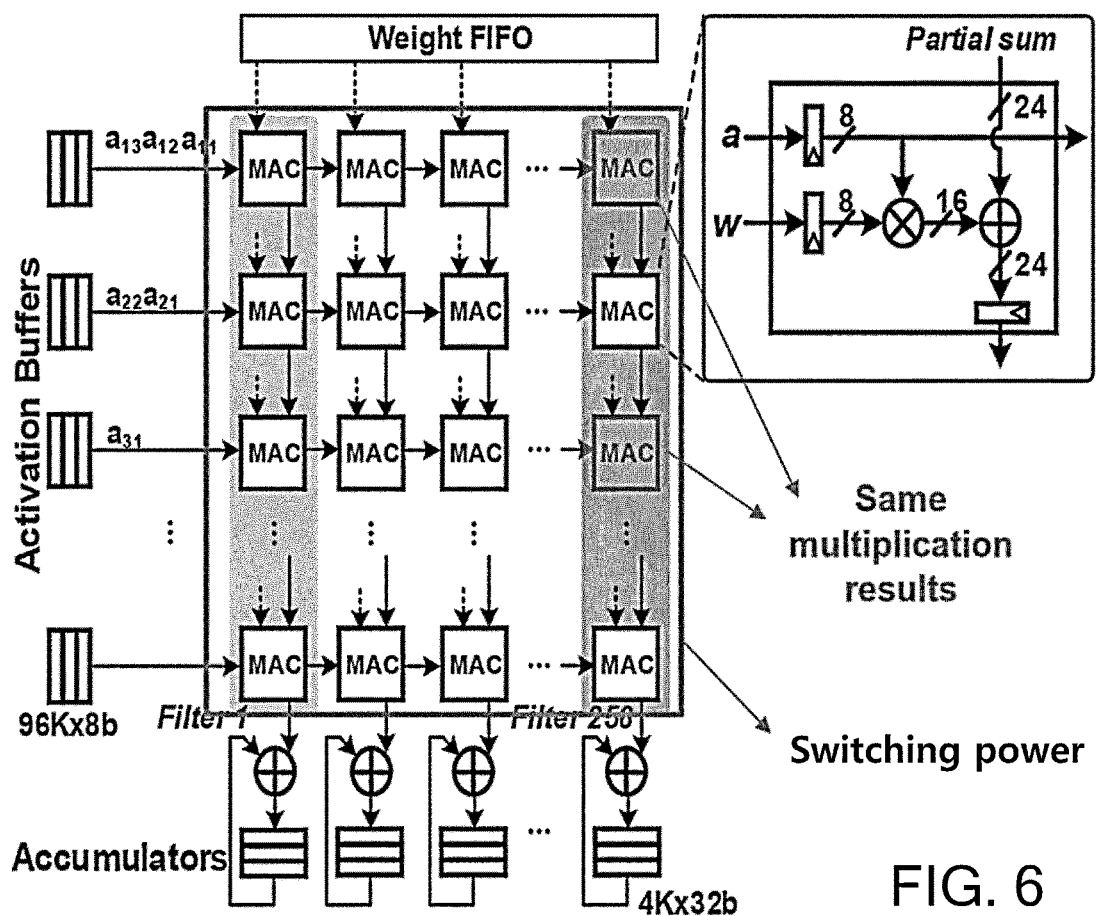
FIG. 6 shows an example of general multiply-accumulate hardware for a deep learning neural network operation.
Figure 7:
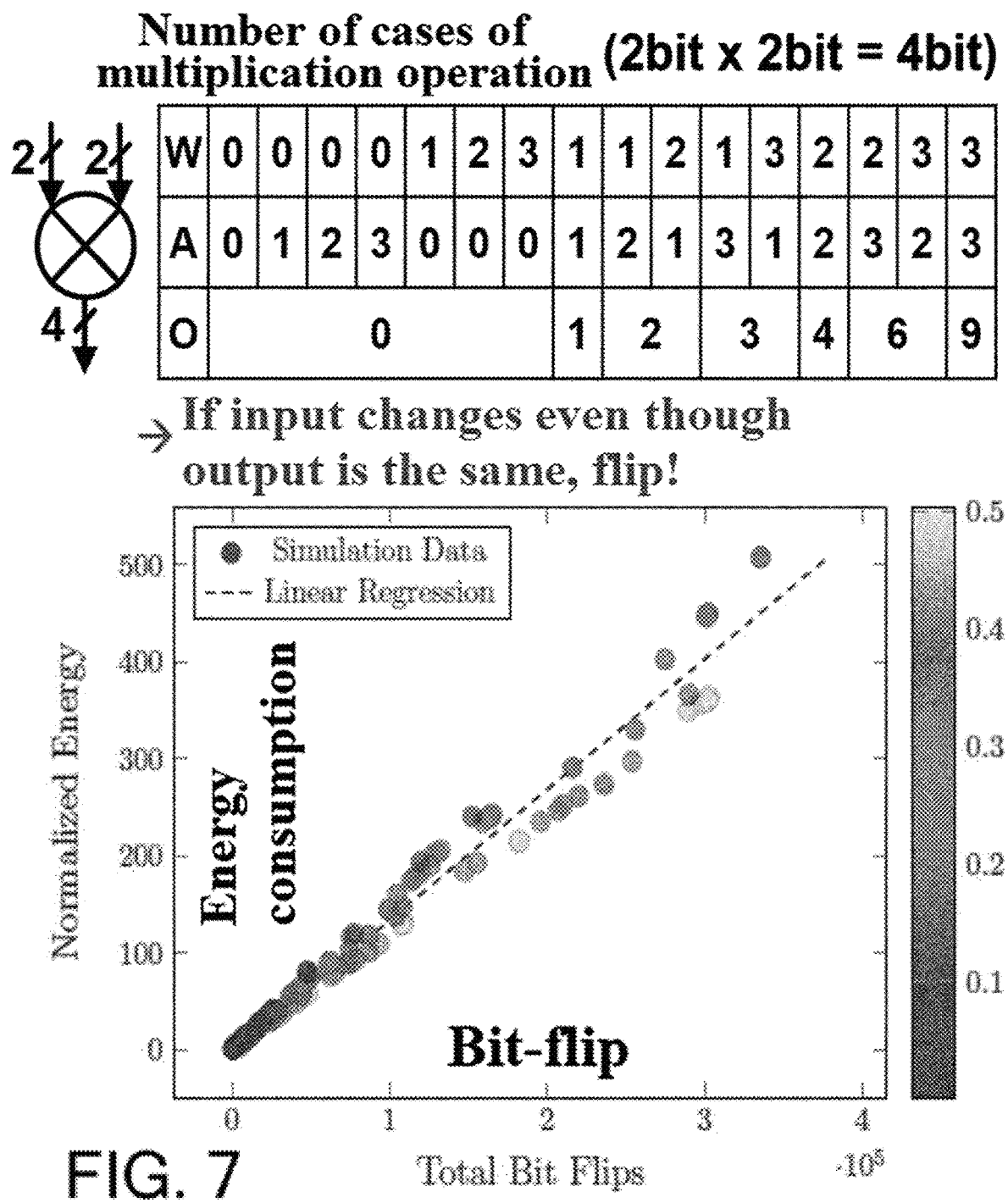
FIG. 7 shows an increase in energy (power) consumption according to a bit-flip of input data generated in the multiply-accumulate hardware of FIG. 6.

FIG. 6 shows an example of general multiply-accumulate hardware for a deep learning neural network operation, and FIG. 7 shows an increase in energy (power) consumption according to a bit-flip of input data generated in the multiply-accumulate hardware of FIG. 6. In addition, FIG. 8 shows a conceptual diagram of a multiply-accumulate operation performed in a general multiplier-accumulator.

Referring to FIGS. 6 and 7, an increase in energy (or power) consumption due to bit-flip in hardware of a general deep learning neural network may be known. That is, the hardware of a general deep learning neural network performs a multiply-accumulation operation in a 2D array structure, and when the input data is changed, switching power consumption occurs inside the hardware for multiplications having the same result value due to bit-flip. Referring to FIG. 7, it can be seen that the number of such bit-flips and the energy consumption are proportional to each other.

Figure 8:
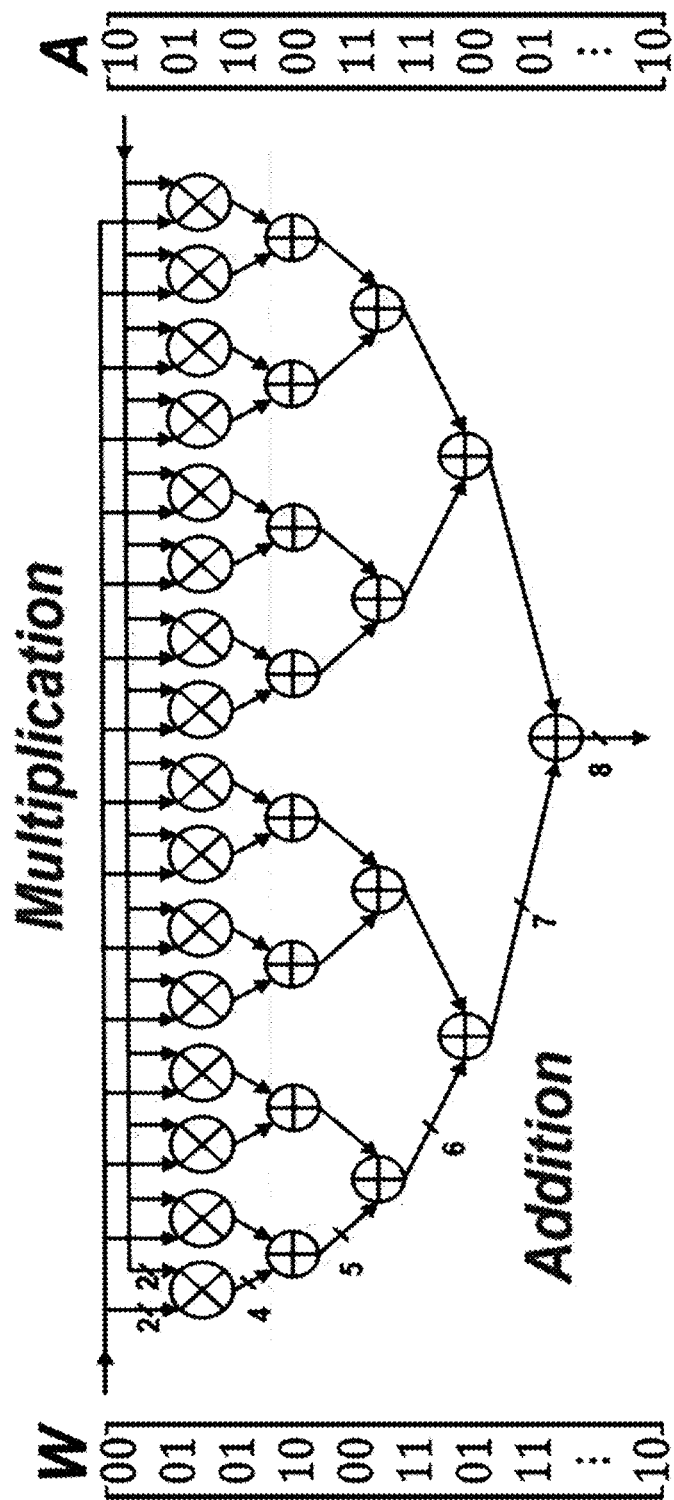
FIG. 8 shows a conceptual diagram of a multiply-accumulate operation performed in a general multiplier-accumulator.

In particular, the 2D array structure of general multiply-accumulate hardware as shown in FIG. 6 has a structure using a plurality of the structures of FIG. 8. In this case, in the structure of FIG. 8, the most energy consuming part is a multiplier, and it is inefficient in terms of power efficiency of the entire hardware to repeatedly consume switching power due to bit-flip for multiplications having the same result value.

As such, the present invention aims to reduce power consumption of hardware, by performing a deep learning neural network operation based on a pop-count (i.e., a first operation method). That is, the present invention predicts which multiplication operation is repeated according to the distribution of input data, and replaces the previous multiply-accumulate operation with a pop-count operation counting the number of repetitions using the same and a constant multiplication operation of the number of repetitions×multiplication result (a predetermined constant). In addition, in the present invention, when the number of repetitions is large, the first operation method is performed, and when the number of repetitions is small, the conventional general multiply-accumulate operation method (i.e., the second operation method) is performed such that at relatively high bit-precision, it is possible to further improve efficiency at low bit-precision while being scalable to eliminate repetitive operations even at high bit-precision.

Figure 9:
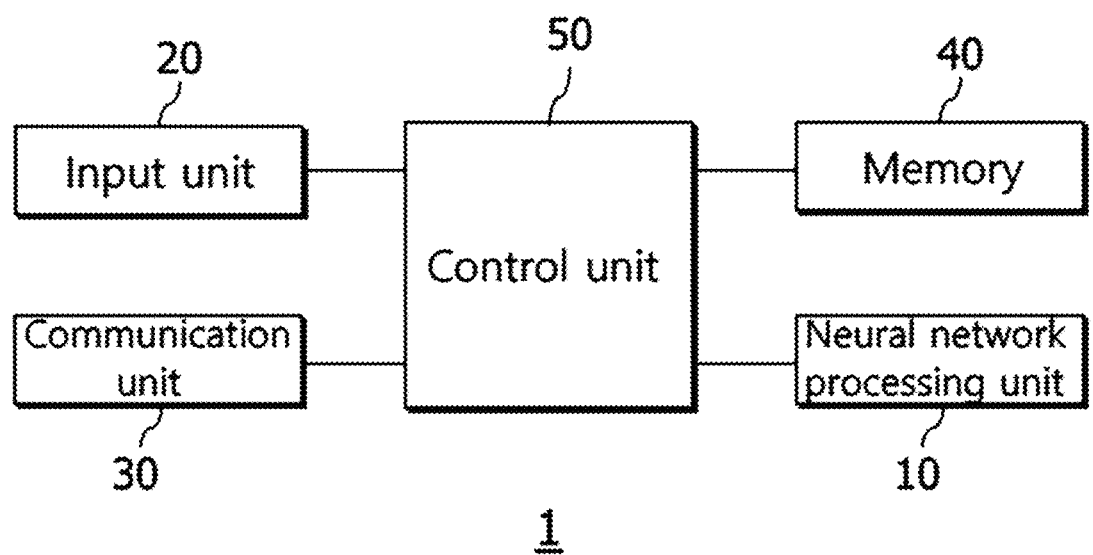
FIG. 9 shows a block diagram of an electronic device 1 according to an exemplary embodiment of the present invention.

FIG. 9 shows a block diagram of an electronic device 1 according to an exemplary embodiment of the present invention.

The electronic device 1 according to an exemplary embodiment of the present invention is a device capable of computing that performs an operation for a deep learning neural network.

For example, the electronic device may be a desktop personal computer (desktop PC), a laptop personal computer, a tablet personal computer (tablet PC), a netbook computer, a workstation, a personal digital assistant (PDA), a smartphone, a smartpad, a mobile phone, or the like, but is not limited thereto.

In this case, the deep learning neural network is an artificial neural network for modeling according to a deep learning technique, and may include the input layer, the hidden layer, and the output layer described above according to FIGS. 1 to 3, and a plurality of nodes in each layer. Such a deep learning neural network may be a learning model which is pre-trained by learning data according to various deep learning techniques.

That is, the deep learning neural network may include a plurality of layers and have a function for a relationship between an input and an output through learning. That is, the deep learning neural network expresses the relationship between inputs and outputs as a plurality of hidden layers. For example, when input data is input to an input layer for a pre-trained model of a deep learning neural network, output data according to a function action of the corresponding hidden layer may be output to an output layer. In this case, each of the plurality of hidden layers may include at least one filter, and each filter may have a weight matrix.

For example, the deep learning technique may include deep neural network (DNN), convolutional neural network (CNN), recurrent neural network (RNN), restricted Boltzmann machine (RBM), deep belief network (DBN), deep Q-networks, and the like, but is not limited thereto.

As illustrated in FIG. 9, such an electronic device 1 may include a neural network processing unit 10, an input unit 20, a communication unit 30, a display (not shown), a memory 40, and a control unit 50.

The neural network processing unit 10 is a component that performs a multiply-accumulate operation for an operation on a deep learning neural network, and may be hardware implemented by various circuits and the like. However, detailed description of the configuration and operation of the neural network processing unit 10 and the like will be described below.

The input unit 20 generates input data in response to inputs of various users (surveillants, etc.), and may include various input means. For example, the input unit 20 may include a keyboard, a keypad, a dome switch, a touch panel, a touch key, a touch pad, a mouse, a menu button, and the like, but is not limited thereto. For example, the input unit 20 may receive an input such as a command for a deep learning neural network operation and the like.

The communication unit 30 is a configuration that communicates with other devices. For example, the communication unit 30 may perform wireless communication such as 5$^{th}$ generation communication (5G), long term evolution-advanced (LTE-A), long term evolution (LTE), bluetooth, bluetooth low energy (BLE), near field communication (NFC), Wi-Fi communication, and the like, or wired communication such as cable communication and the like, but is not limited thereto. For example, the communication unit 30 may receive information for a deep learning neural network from another device, and transmit the operation result and the like for the deep learning neural network to another device.

The memory 40 stores various types of information necessary for the operation of the electronic device 1. The stored information may include information for the deep learning neural network, information for statistical values for the first and second data, program information related to a calculation method for the deep learning neural network, and the like to be described below, but is not limited thereto. For example, the memory 40 may be a hard disk type, a magnetic media type, a compact disc read only memory (CD-ROM), an optical media type, a magneto-optical media type, a multimedia card micro type, a flash memory type, a read only memory (ROM) type, a random access memory (RAM) type, or the like depending on its type, but is not limited thereto. In addition, the memory 40 may be a cache, a buffer, a main memory device, an auxiliary memory device, or a storage system separately provided depending on the purpose/location, but is not limited thereto.

Meanwhile, the electronic device 1 may further include a display (not shown). In this case, the display shows various image data on a screen and may be configured as a non-light-emitting panel or a light-emitting panel. For example, the display may include a liquid crystal display (LCD), a light emitting diode (LED) display, an organic light emitting diode (organic LED) display, micro-electro mechanical systems (MEMS), an electronic paper display, or the like but is not limited thereto. In addition, the display may be combined with an input unit 20 to be implemented as a touch screen or the like. For example, the display may show results such as information for a deep learning neural network, configuration information for a deep learning neural network operation, an operation result of the deep learning neural network, and the like, on a screen.

The control unit 50 may perform various control operations of the electronic device 1. That is, the control unit 50 may control the execution of the deep learning neural network computation method to be described below, and may control the remaining configurations of the electronic device 1, that is, a neural network processing unit 10, an input unit 20, a communication unit 30, a display (not shown), a memory 40, and the like. For example, the control unit 50 may include a processor which is hardware, a process which is software that is performed by the processor, or the like, but is not limited thereto.

Figure 10:
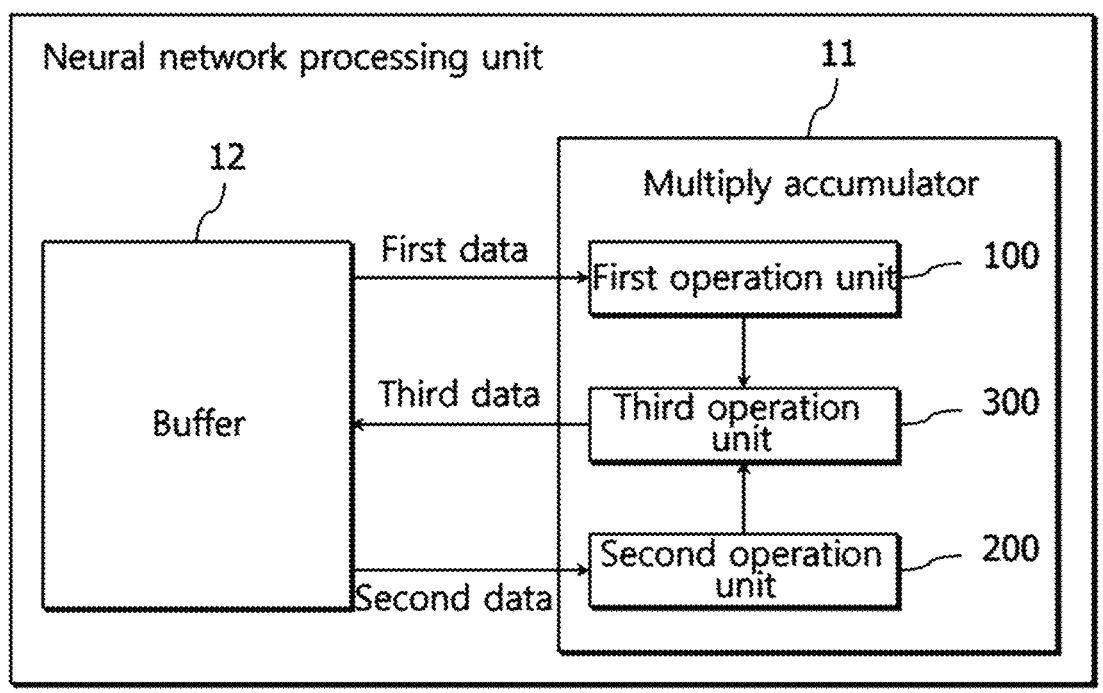
FIG. 10 shows a block diagram of a neural network processing unit 10 in an electronic device 1 according to an exemplary embodiment of the present invention.

FIG. 10 shows a block diagram of a neural network processing unit 10 in an electronic device 1 according to an exemplary embodiment of the present invention.

The neural network processing unit 10 processes an operation for a deep learning neural network, and may include a multiply accumulator 11 and a buffer 12 as illustrated in FIG. 10. A configuration including such a multiply accumulator 11 or a multiply accumulator 11 and a buffer 12 may be a hardware configuration implemented with various circuits. However, in the multiply accumulator 11, that is, in the first operation unit to the third operation unit 100, 200, and 300, the hardware configuration such as a process and the like may be a software configuration. In this case, information on the corresponding software may be stored in the memory 40, and it may operate under the control of the control unit 50. In addition, the neural network processing unit 10 or the multiply accumulator 11 may be a hardware configuration separately provided in the control unit 50.

The multiply accumulator 11 is a configuration that performs an operation for multiply accumulation, and may include the first operation unit to the third operation unit 100, 200, and 300.

Figure 11:
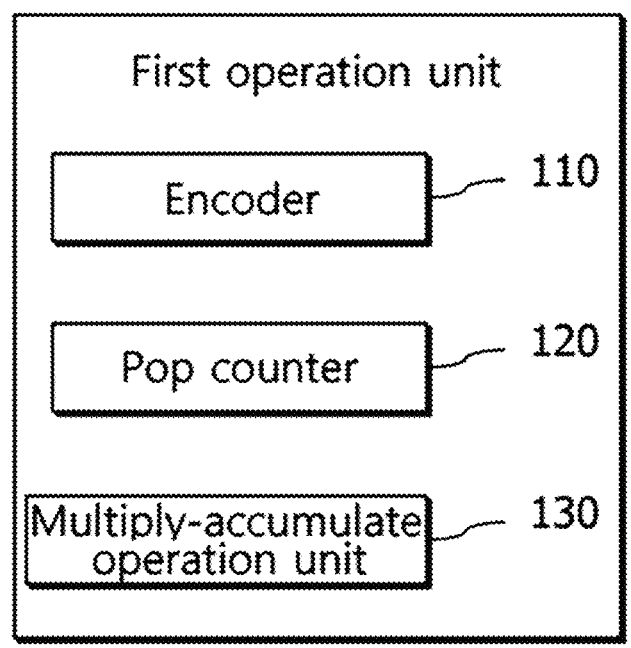
FIG. 11 shows a block diagram of a first operation unit 100.
Figure 12:
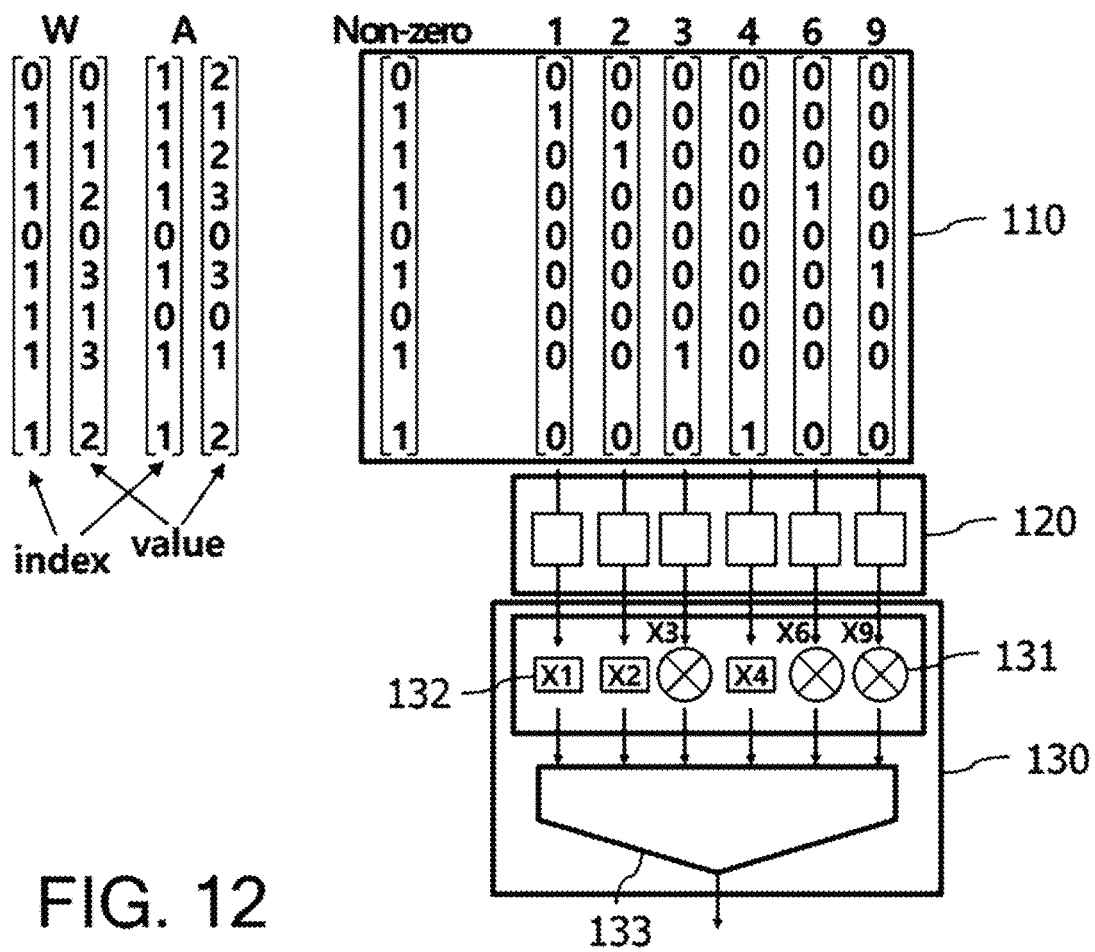
FIGS. 12 and 13 show various examples of the operation of the first operation unit 100.
Figure 13:
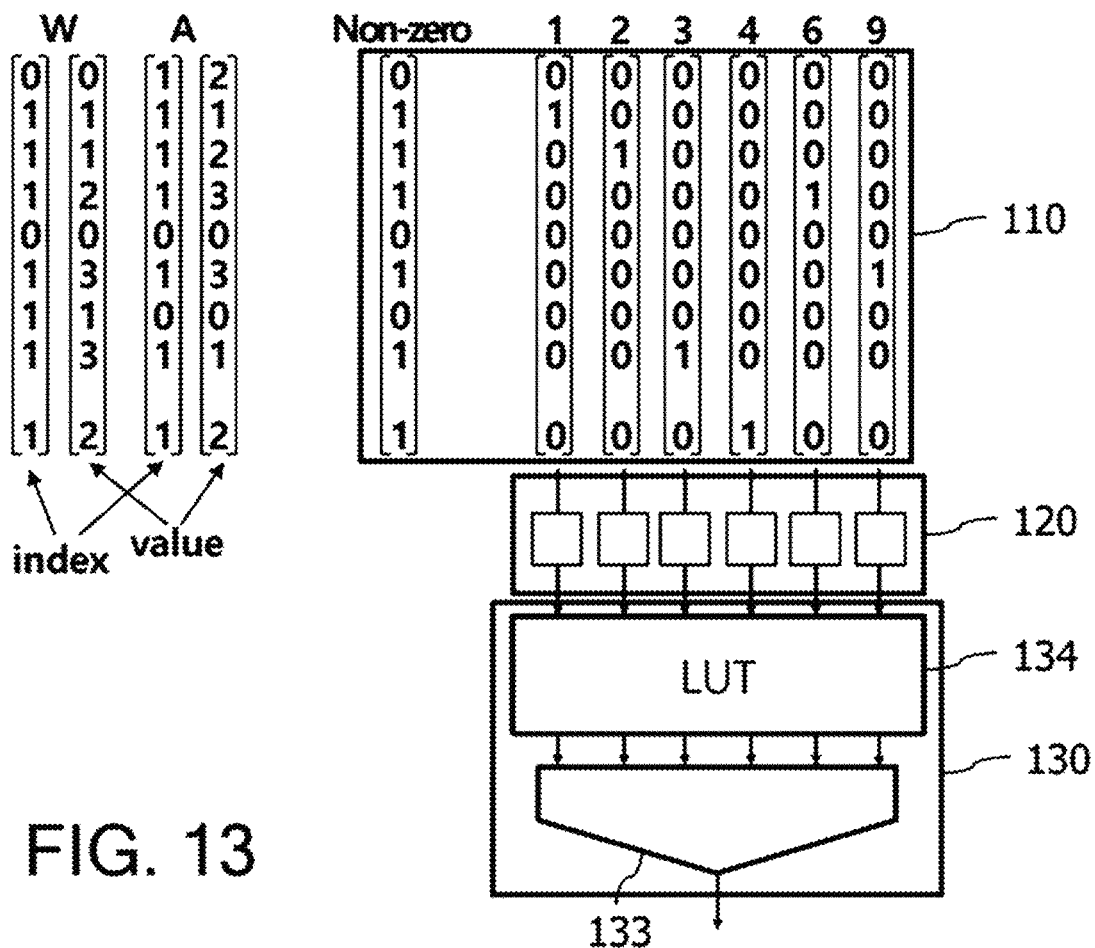

FIG. 11 shows a block diagram of a first operation unit 100, and FIGS. 12 and 13 show various examples of the operation of the first operation unit 100.

The first operation unit 100 is a configuration that performs a first operation method, that is, a pop-count-based processing, and as illustrated in FIGS. 11 to 13, it may include an encoder 110, a pop counter 120, and a multiply-accumulate operation unit 130. That is, the first operation unit 100 may have a structure in which a repetitive multiplication operation is replaced with a simple pop count operation and a constant multiplication operation.

The encoder 110 generates one-hot encoding codes according to the type of the first multiplication result values for multiplication of input data, that is, multiplications (first multiplications) between weights (W) and input values (A). That is, for each first multiplication, a multiplication operation using a multiplier having a big load is not performed, but a one-hot encoding code is generated that matches the type of the first multiplication (i.e., the type of the first multiplication result value) according to the bit type of the weight (W) and the bit type of the input value (A), without performing a multiplication operation using a multiplier having a large load.

Specifically, according to the number of bits of the weight (W) and the input value (A), the number of the types of finite first multiplication result values is also determined, and each of the finite types of the first multiplication result values has constant values that are different from each other. In addition, the type of the first multiplication result values may be matched according to the bit type of the weight (W) and the input value (A), and a one-hot encoding code may be generated according to the type of the matched first multiplication result value.

That is, the one-hot encoding code may have as many bits as the number of the types of the first multiplication result values. In this case, by assigning a bit of 1 only to the bit place for the type of the result value corresponding to the first multiplication, and assigning a bit of 0 to the bit place of the other result value type to which the first multiplication does not correspond, each first multiplication may be expressed by a one-hot encoding code.

For example, as illustrated in FIGS. 12 and 13, when the weights W and the input values (A) each have 2-bit, the result value has 6 types of 1, 2, 3, 4, 6, and 9 except 0. In this case, the first multiplication result values of 1, 2, 3, 4, 6, and 9 have constant values that are different from each other. That is, 6 bit places are provided for 6 as the number of 1, 2, 3, 4, 6, and 9, which are the types of the first multiplication result values, and according to the types of the 2-bit weight (W) and input value (A), the type of the first multiplication result value is classified, and a bit of 1 or 0 is assigned to each provided bit place.

That is, when the first multiplication, which is a multiplication of the weight (W) and the input value (A), is [01]×[01], 1 is assigned only to the bit place of the result value type of 1 to generate a code of [100000], and when the first multiplication is [01]×[10] or [10]×[01], 1 is assigned only to the bit place of the result value type of 2 to generate a code of [010000]. In addition, when the first multiplication is [01]×[11] or [11]×[01], 1 is assigned only to the bit place of the result value type of 3 to generate a code of [001000], and when the first multiplication is [10]×[10], 1 is assigned to only the bit place of the result value type of 4 to generate a code of [000100]. In addition, when the first multiplication is [10]×[11] or [11]×[10], 1 is assigned only to the bit place of the result value type of 6 to generate a code of [000010], and when the first multiplication is [11]×[11], 1 is assigned to only the bit place of the result value type of 9 to generate a code of [000001]. In this way, for each first multiplication, a one-hot encoding code may be generated by classifying the type of the result value according to the type of the weight (W) and the input value (A).

Certainly, even when the result value of the first multiplication is 0, a one-hot encoding code may be generated by assigning the bit place. However, as illustrated as illustrated in FIGS. 12 and 13, when the result value of the first multiplication is 0, it may be displayed separately from the one-hot encoding code. In the case of the first multiplication whose result value is 0, since operations such as multiplication, accumulation, and the like are not required, the corresponding case is separately displayed.

For example, as illustrated in FIGS. 12 and 13, for each value of the weight (W) and the input value (A), each value of 0 (zero) or not zero (non-zero) is indicated in advance as an index (if it is 0, it is displayed as 0), and then if at least one of the corresponding indexes is 0, the result value of the first multiplication is 0, which is separately displayed in the area classified as non-zero. That is, the first multiplication in which the non-zero area is 0 is a case in which the result value is 0. On the other hand, the first multiplication in which the non-zero area is 1 is when the result value is not 0, and for the corresponding first multiplication, according to the bit type of the weight (W) and the input value (A), the type of the first multiplication result value is classified, and a one-hot encoding code is generated.

Figure 14:
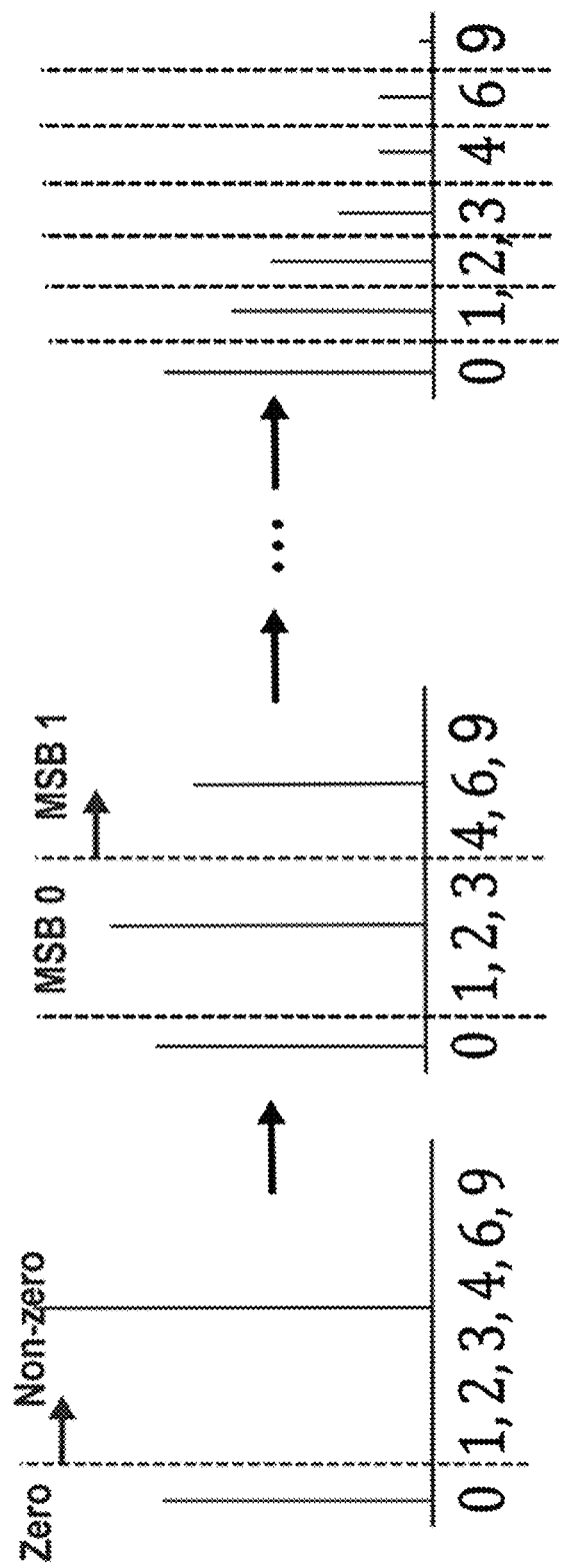
FIG. 14 shows a process of generating a one-hot encoding code step by step for efficient pop-count.

FIG. 14 shows a process of generating a one-hot encoding code step by step for efficient pop-count.

Meanwhile, the part that occupies the greatest weight in the first operation unit 100 is a part that searches for a one-hot encoding value and performs a pop-count, and efficient implementation of this part is very important. Accordingly, by firstly classifying zero/non-zero and generating a one-hot encoding value by classifying in half step by step, it is possible to efficiently implement a pop-count operation.

For example, as illustrated in FIG. 14, after the encoder 110 first performs a first classification for classifying the non-zero area (i.e., distinguishing whether the result value is 0 for each first multiplication), a second classification may be performed for the type of the result value, for each first multiplication in which the non-zero area is 1 (i.e., each first multiplication that is classified as having the result value as non-zero).

In addition, for the second classification, after the encoder 110 performs a second-1 classification which classifies the type of the result values into two groups based on the most significant bit (MSB) of the weight (W) and the input value (A) for each first multiplication classified as non-zero, a second-2 classification may be performed that classifies the type of the result values for the two groups for the first multiplication belonging to each group.

For example, in the case of the first multiplication in which the multiplication of the weight (W) and the input value (A) is [00]×[00], [01]×[00] or [00]×[01], the bit of the weight (W) is all 0 or the bit of the input value (A) is all 0 (or any one of the indexes is 0), and thus the result value may be firstly classified as 0.

In addition, in the case of the first multiplication in which the multiplication of the weight (W) and the input value (A) is [01]×[01], the bits of the weight (W) and the input value (A) are not all 0 (or, since the indexes are all 1), and thus, the result value may be firstly classified as non-zero. Afterwards, since at least one of each MBS of [01] and [01] is 0, the result value may be secondly-1 classified as one of 1, 2, and 3. Afterwards, according to the type of the remaining bits of [01] and [01], the result value may be secondly-2 classified as 1.

In addition, in the case of the first multiplication in which the multiplication of the weight (W) and the input value (A) is [11]×[10], the bits of the weight (W) and the input value (A) are not all 0 (or since the indexes are all 1), and thus, the result value may be firstly classified as non-zero. Afterwards, since each MBS of [11] and [10] is all 1, the result value may be secondly-1 classified as one of 4, 6, and 9. Afterwards, according to the type of the remaining bits of [11] and [10] and the like, the result value may be secondly-2 classified as 3.

That is, when performing step-by-step processing such as the first and second classifications (second-1 and second-2 classifications) according to the bit type of each bit place of the weight (W) and the input value (A), there is an advantage that the encoder 110 may generate a one-hot encoding code capable of pop-count more efficiently. For example, the encoder 110 may implement such step-by-step processing in a hardware configuration or a software configuration. In particular, in the case of a hardware configuration reflecting such step-by-step processing, there is an advantage that faster and more efficient generation of a one-hot encoding code is possible.

However, the present invention is not limited to such step-by-step performance, and the encoder 110 may perform matching processing for each bit place of A and W in parallel, and classify the result value type such that it has a parallel processing structure that generates a one-hot encoding code for each first multiplication.

The pop counter 120 performs a pop-count for each one-hot encoding code generated by the encoder 110. In this case, for each one-hot encoding code that is a target set, the pop-count processes pop-counting for a number other than 0 (i.e., 1) from the bits assigned to the corresponding place, for each bit place (i.e., for each type of the first multiplication result value) to generate a count value (i.e., a pop-count value) for each place.

For example, the types of the first multiplication result values are 1, 2, 3, 4, 6, and 9, and the encoder 110 may generate 16 one-hot encoding codes as shown in Table 1 below (hereinafter, referred to as "the first example").

TABLE 1

| 16 one-hot encoding codes | Pop-count value of each type of first multiplication result values | | | | | |
|---|---|---|---|---|---|---|
| | Type 1 (1) | Type 2 (2) | Type 3 (3) | Type 4 (4) | Type 5 (6) | Type 6 (9) |
| [100000], [010000], [100000], [010000], [100000], [010000], [100000], [001000], [000100], [000010], [000001], [000100], [000010], [000100], [000001], [000100] | 4 | 3 | 1 | 4 | 2 | 2 |

In the first example, pop-count values according to the first to sixth types are 4, 3, 1, 4, 2 and 2, respectively. That is, through these pop count values, it can be seen that the first type is repeated 4 times, the second type is repeated 3 times, the third type is repeated 1 time, the fourth type is repeated 4 times, the fifth type is repeated 2 times, and the sixth type is repeated 2 times in 16 first multiplications. The multiply-accumulate operation unit 130 accumulates the first multiplication result values based on the pop-count values derived from the pop counter 120. That is, the multiply-accumulate operation unit 130 may accumulate result values of a constant multiplication (second multiplication) between each type of the first multiplication result value which are different constant values and each count value. That is, in the first example, the multiply-accumulate operation unit 130 accumulates a second multiplication result value (i.e., 1×4=4) between 1 which is a first type value and 4 which is a pop count value, a second multiplication result value (i.e., 2×3=6) between 2 which is a second type value and 3 which is a pop count value, a second multiplication result value (i.e., 3×1=3) between 3 which is a third type value and 1 which is a pop count value, a second multiplication result value (i.e., 4×4=16) between 4 which is a fourth type value and 4 which is a pop count value, a second multiplication result value (i.e., 6×2=12) between 6 which is a fifth type value and 2 which is a pop count value, and a second multiplication result value (i.e., 9×2=18) between 9 which is a sixth type value and 2 which is a pop count value.

In this case, the multiply-accumulate operation unit 130 may derive a second multiplication result value by using a constant multiplier 131 that performs a multiplication operation (constant value×variable value) between the first multiplication result value (constant value) and the count value (variable value). In addition, the multiply-accumulate operation unit 130 may derive a second multiplication result value by using a shifter 132 that performs a shift for the bit of the first multiplication result value (constant value). However, the shifter 132 may derive a second multiplication result value by simply shifting the bit of the constant value to the left, or shifting the bit of the constant value to the left and assigning 1 to the last bit to derive the second multiplication result value. When performing such a shift, the operation of assigning 1 to the last bit may be selected according to the bit type of the constant value and the variable value.

In FIG. 12, the multiply-accumulate operation unit 130 uses a constant multiplier 131 for the third type (a first multiplication result value is 3), the fifth type (a first multiplication result value is 6), and the sixth type (a first multiplication result value is 9), and uses a shifter 132 for the remaining first type (a first multiplication result value is 1), the second type (a first multiplication result value is 2), and the fourth type (a first multiplication result value is 4) to derive each second multiplication result value, but the present invention is not limited thereto.

For example, the constant value of the first type (the first multiplication result value) is 1, that is, [01], and when the count value is 3, the second multiplication result value is 1×3=3. To this end, by shifting the first type of bit [01] to the left once and assigning 1 to the last place, the second multiplication result value of 3 which is [11] may be derived.

For example, the constant value of the second type is 2, that is, [10], and when the count value is 2, the second multiplication result value is 2×2=4. To this end, by shifting the second type of bit [10] to the left once, a second multiplication result value of 4 which is [100] may be derived.

In addition, the multiply-accumulate operation unit 130 may accumulate the second multiplication result values derived by the constant multiplier 131 or the shifter 132 by using an adder tree 133 that performs an accumulation operation for inputs.

Meanwhile, in FIG. 13, the multiply-accumulate operation unit 130 may derive the second multiplication result values by using a lookup table (LUT) 134 in which the second multiplication result values are stored. That is, the second multiplication result values of the first multiplication result value (constant value) and the count value (variable value) are stored in the lookup table. If only the count value (variable value) is input into the lookup table 134, or the first multiplication result value (constant value) and the count value (variable value) are input, the second multiplication result value matching the same without a multiplication operation may be obtained. However, even in this case, the second multiplication result values obtained through the lookup table 134 may be accumulated using the adder tree 133. However, the present invention is not limited thereto, and the multiply-accumulate operation unit 130 may accumulate the second multiplication result values by performing distributed arithmetic based on the lookup table 134 in which the second multiplication result value is stored.

That is, the first operation unit 100 matches which multiplication results are present in the current weight and the input value through a circuit that sees a combination of the weight (W) and the input value (A) and matches the multiplication result (e.g., 1, 2, 3, 4, 6, and 9) which is non-zero to generate one-hot encoding. Afterwards, the first operation unit 100 performs a pop-count on the one-hot encoding values. Afterwards, the first operation unit 100 performs a constant multiplication operation between the number of repetitions of each first multiplication obtained through pop-count and the known first multiplication result value (predetermined constant value), and by accumulating the constant multiplication operations, the same result as the multiply-accumulate operation illustrated in FIG. 8 may be obtained.

In particular, in the constant multiplication operation, since one operand of the multiplication is a constant value, there is an advantage that it consumes a very small area and power compared to a general multiplication operation in hardware implementation. In addition, matching operation and pop-count operation to find one-hot encoding are also more efficient operations in hardware implementation than conventional operations. Therefore, when the hardware configuration as illustrated in FIGS. 12 and 13 is implemented, there may be an advantage that overall power efficiency is superior to that of hardware based on the conventional multiply-accumulate operation illustrated in FIG. 8.

Figure 17:
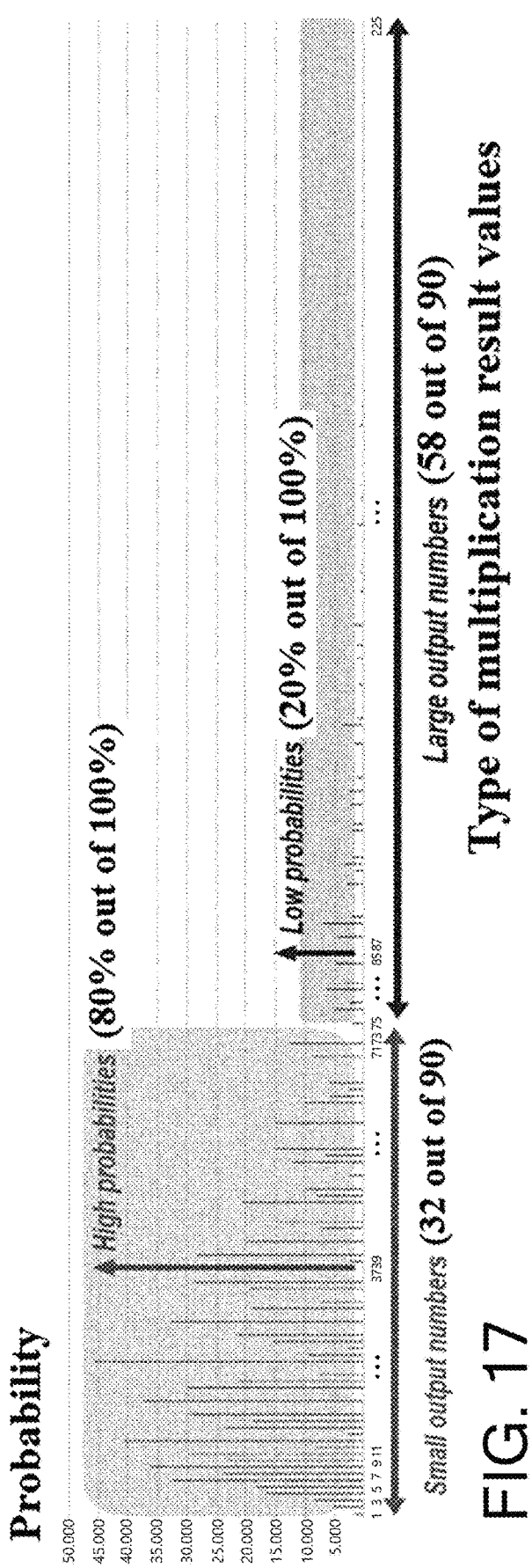
FIG. 17 shows an example of a simulation result for a repetition probability distribution of first multiplication result values at 4-bit×4-bit precision.

FIG. 17 shows an example of a simulation result for a repetition probability distribution of first multiplication result values at 4-bit×4-bit precision.

Meanwhile, when all operations are performed by pop-count-based operations according to the first operation method, it must cover all types of the first multiplication result values having a large number thereof at relatively high bit-precision, and thus, pop-count overhead increases dramatically. In addition, even within low bit-precision, as illustrated in FIG. 17, since the type of the first multiplication result values having a relatively high repetition probability and the type of the multiplication result values having a relatively low repetition probability are clearly divided, there is a need for a configuration such as a scalable hardware structure and the like that may sufficiently utilize the same and apply an effect of removing the repeated first multiplication even at high bit-precision.

Accordingly, the first multiplications may be classified into a plurality of data according to the repetition probability of the result value type. That is, the first multiplications belonging to frequently repeated data (first data) due to a relatively high repetition probability are processed by the first operation unit 100. On the other hand, the second operation unit 200 processes the first multiplications belonging to data (second data) that are not frequently repeated due to a relatively low repetition probability. However, with respect to the first and second data, it is preferable that the statistical values are pre-stored in the memory 40 through statistical processing.

Next, the second operation unit 200 is a configuration that performs a multiply-accumulate operation different from that of the first operation unit 100. For example, the second operation unit 200 may be a configuration that performs a second operation method. In this case, as in the conventional technology, for the first multiplication, the second operation unit 200 may perform a multiplication operation between the corresponding respective weights (W) and the corresponding respective input values (A), and perform an accumulation operation for the result value of the multiplication operation, respectively. For example, for each of these operations, the second operation unit 200 may have the structure of FIG. 6 or 7, but is not limited thereto.

For example, in the input data, when W is $W_1$, $W_2$, $W_3$, and $W_4$, and A is $A_1$, $A_2$, $A_3$, and $A_4$, the second operation unit 200 may be configured to perform a first multiplication operation for each of $W_1 \times A_1$, $W_2 \times A_2$, $W_3 \times A_3$, and $W_4 \times A_4$ and an accumulation operation for the first multiplication result values (i.e., $W_1 \times A_1 + W_2 \times A_2 + W_3 \times A_3 + W_4 \times A_4$) for these first multiplication result values, respectively.

The third operation unit 300 accumulates result values of the first and second operation units 100 and 200. That is, the third operation unit 300 accumulates an accumulation result value of the first multiplications belonging to the first data processed by the first operation unit 100 (i.e., an accumulation result value of the first multiplication result values of the first data), and an accumulation result value of the first multiplications belonging to the second data processed by the second operation unit 200 (i.e., an accumulation result value of the first multiplication result values of the second data).

As described above, by classifying the entire input data into first data having a high repetition probability and second data having a low repetition probability, the present invention may perform various multiply-accumulations for each first multiplication according to the type of each classified data. In particular, the first data may be performed by the first operation unit 100 based on a pop-count-constant multiplication, thereby having an effect of reducing the repetitive operations. In addition, the part having a large one-hot encoding generation overhead compared to the repetition probability such as the second data is processed by the second operation unit 200 based on a general multiply-accumulation.

When such structure is applied, data in which most of the repetition probability (80% in FIG. 17) of the total data is concentrated in the type of the first multiplication result value are processed by the first operation unit 100 based on the pop-count-constant multiplication, the power consumption may be considerably reduced while improving the processing speed. In addition, the second operation unit 200 may maintain a fast operation processing speed even if there is only a much smaller multiply-accumulator (20% in FIG. 17) than previous multiply-accumulate-based hardware.

However, a control for synchronizing the processing speed between the first operation unit 100 and the second operation unit 200 may be required.

A buffer 12 is a memory that temporarily stores various data necessary for the operation of the multiply accumulator 11, that is, the operation of the first operation unit to the third operation unit 100, 200, and 300, and may provide a function of a global buffer for the first operation unit to the third operation unit 100, 200, and 300. For example, the buffer 12 operates at a high speed between the control unit 50 and the memory 40 such that data transfer between the first operation unit to the third operation unit 100, 200, 300 and the memory 40 may be linked. That is, the buffer 12 may transfer first data to the first operation unit 100 and second data to the second operation unit 200. In addition, the buffer 120 may receive third data, which is a result value accumulated by the third operation unit 300, from the third operation unit 300.

Meanwhile, the neural network processing unit 10 may include a separate control unit (not shown) such as a processor and the like. The control unit may control the operations of the multiply accumulator 11 and the buffer 12 described above, according to a command of the control unit 50 of the electronic device 1, but is not limited thereto.

Hereinafter, a computation method of a deep learning neural network according to various exemplary embodiments of the present invention will be described.

Figure 15:
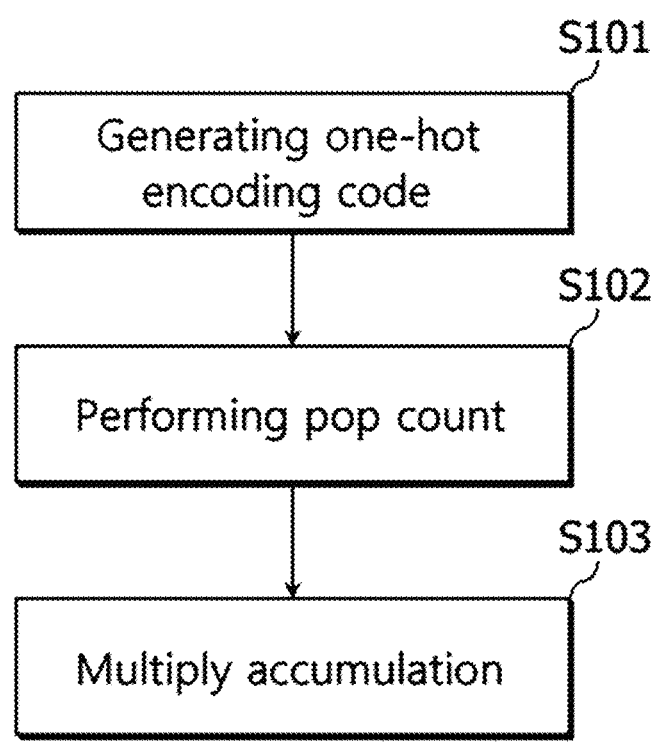
FIG. 15 shows a flowchart diagram of a computation method of a deep learning neural network according to an exemplary embodiment of the present invention.

FIG. 15 shows a flowchart diagram of a computation method of a deep learning neural network according to an exemplary embodiment of the present invention.

The computation method of a deep learning neural network according to an exemplary embodiment of the present invention includes S101 to S103 as illustrated in FIG. 15. Such S101 to S103 may be controlled by the control unit 50, and may be steps in which the operation of the first operation unit 100 of the neural network processing unit 10 is performed as described above.

S101 is a step of generating one-hot encoding codes according to the type of the first multiplication result values, for multiplications (first multiplication) between the weights (W) and the input values (A), respectively.

For example, in S101, a one-hot encoding code may be generated by classifying the type of the first multiplication result value according to the bit types of the weight and the input value.

Specifically, S101 may include a first classifying step of classifying whether the result value is 0 (zero) for the first multiplication, a second classifying step of classifying the type of the remaining result value for each first multiplication in which the result value is classified as not 0 (non-zero), and a step of generating a one-hot encoding code based on the result classified in the second classifying step, respectively.

In addition, the second classifying step may include a second-1 classifying step of classifying the type of the result value into two groups based on the most significant bit of the weight and the input value for each first multiplication classified as non-zero, and a second-2 classifying step of classifying the type of the result value for the first multiplication belonging to each group for the two groups, respectively.

That is, S101 may be a step in which the operation of the encoder 110 of the first operation unit 100 described above is performed.

Afterwards, S102 is a step of performing a pop-count for each one-hot encoding code generated in S101. That is, S102 may be a step in which the operation of the pop counter 120 of the first operation unit 100 described above is performed.

Afterwards, S103 is a step of accumulating the result values of a constant multiplication (second multiplication) between each type of the first multiplication result value and each count value of the pop-count, which are different constant values.

Specifically, S103 may include a first deriving step of deriving the second multiplication result values, and a second deriving step of deriving accumulated result values for the second multiplication result values.

For example, the first deriving step may include a step of using a constant multiplier that performs a multiplication operation between the constant value and the count value, or a step of using a shifter that performs a shift for the bit of the constant value. In addition, the first deriving step may include a step of using a lookup table in which the second multiplication result values are stored.

In addition, the second deriving step may include a step of using an adder tree that performs an accumulation operation between the second multiplication result values.

Meanwhile, S103 may include a step of performing distributed arithmetic based on a lookup table in which the second multiplication result values are stored.

That is, S103 may be a step in which the operation of the multiply-accumulate operation unit 130 of the first operation unit 100 described above is performed.

Figure 16:
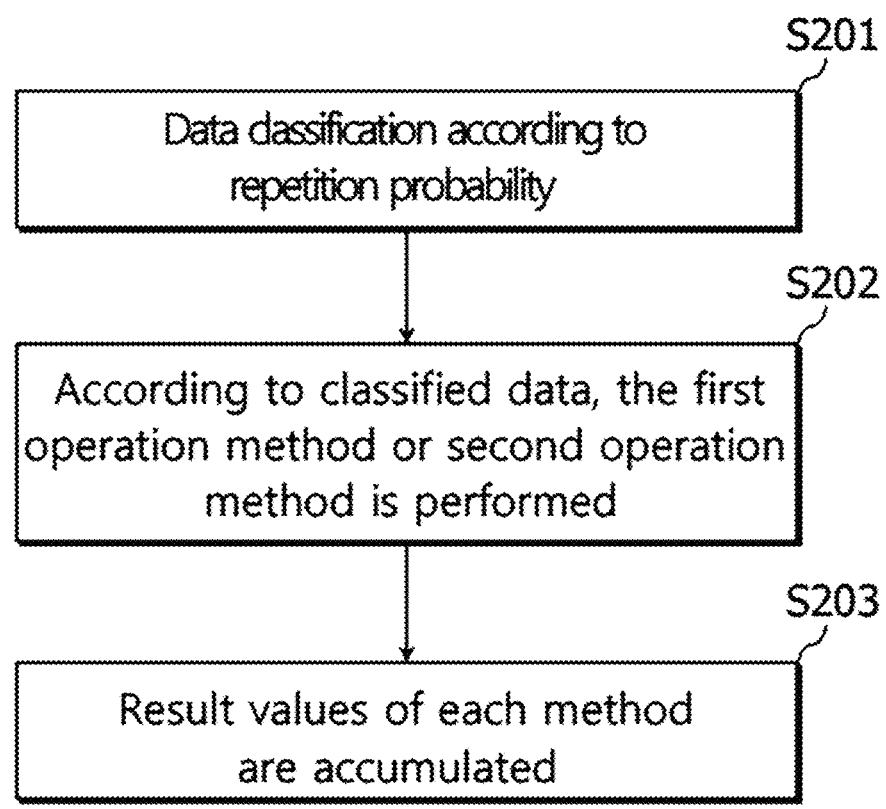
FIG. 16 shows a flowchart diagram of a computation method of a deep learning neural network according to another exemplary embodiment of the present invention.

FIG. 16 shows a flowchart diagram of a computation method of a deep learning neural network according to another exemplary embodiment of the present invention.

The computation method of a deep learning neural network according to another exemplary embodiment of the present invention includes S201 to S203, as illustrated in FIG. 16. Such S201 to S203 may be controlled by the control unit 50, and may be performed by the first operation unit to the third operation unit 100, 200, and 300 of the neural network processing unit 10 as described above.

S201 is a step of classifying each type of the first multiplication result values into a plurality of data according to the repetition probability. In this case, a plurality of data may be classified based on statistical data previously stored in the memory 40 and transmitted to the buffer 12. For example, it may be classified into first data having a relatively high repetition probability and second data having a relatively low repetition probability.

Afterwards, S202 is a step in which a first operation method or a second operation method is performed according to the classified data.

S202 may include a first operating step of applying the first operation method according to S101 to S103 for the first multiplication belonging to the first data. That is, the first operating step may be a step in which the operation of the first operation unit 100 described above is performed.

In addition, S202 may include a second operating step of performing a multiply-accumulate operation which is different from the first operating step for the first multiplication belonging to the second data. For example, a second operation method may be applied that performs a multiplication operation between each corresponding weight and each corresponding input value, and an accumulation operation for the result value of the multiplication operation, respectively. That is, the second operating step may be a step in which the operation of the second operation unit 200 described above is performed.

Afterwards, S203 is a step of accumulating the result values of the first and second operating steps. That is, S203 may be a step in which the operation of the third operation unit 300 described above is performed.

The present invention constituted as described above converts multiplications having the same result values that are accumulated in a large amount of operations for a deep learning neural network such as a deep neural network and the like with low bit-precision into a pop-count operation and a constant multiplication, thereby improving processing speed, and there is an advantage that the area and power consumption of the hardware can be significantly reduced. In addition, the present invention has an advantage that it can be applied to various hardware such as mobile devices, edge devices, servers, and the like that process deep learning neural network operations.

In the detailed description of the present invention, specific exemplary embodiments have been described, but various modifications may be made without departing from the scope of the present invention. Therefore, the scope of the present invention is not limited to the described exemplary embodiments, and should be defined by the claims to be described below and equivalents to the claims.

INDUSTRIAL APPLICABILITY

The present invention relates to a deep learning neural network computation method, a multiply accumulator, and a device thereof, and the present invention has industrial applicability because it can provide a method of processing an operation for a deep learning neural network such as a deep neural network (DNN) and the like based on a pop-count, a multiply accumulator, and a device thereof.

The invention claimed is:

1. A processor-implemented computation method for a deep learning neural network, the computation method comprising:
    classifying result values of first multiplications of weights (W) and input values (A) according to a result value repetition probability, each first multiplication result value comprising a type of a plurality of types which represent constant values;
    selecting between a first operation method and a second operation method based on the classified multiplication result values;
    the first operation method comprising:
        generating, using an encoder, one-hot encoding codes according to each type of first multiplication result values from the first multiplications;
        determining, using a pop counter, pop-counts for each generated code of the one-hot encoding codes; and
        performing, with a multiply-accumulate operation circuit, a second multiplication between each type of the first multiplication result values and each count value of the pop-counts, wherein each type of the first multiplication results values is a different constant value;
    the second operation method comprising:
        performing the first multiplications by applying the weights and input values to at least one multiplier circuit of a multiply-accumulate hardware.

2. The computation method of claim 1, wherein the accumulating comprises:
    performing a first deriving operation of deriving the second multiplication result values; and
    performing a second deriving operation of deriving an accumulated result value for the second multiplication result values.

3. The computation method of claim 2, wherein the performing the first deriving operation comprises using a constant multiplier that performs a multiplication operation between the constant value and the count value, or using a shifter that performs a shift for a bit of the constant value.

4. The computation method of claim 3, wherein the performing the second deriving operation comprises using an adder tree that performs an accumulation operation between the second multiplication result values.

5. The computation method of claim 2, wherein the performing the first deriving operation comprises using a lookup table in which the second multiplication result values are stored.

6. The computation method of claim 1, wherein the accumulating comprises performing distributed arithmetic based on a lookup table in which the second multiplication result values are stored.

7. The computation method of claim 1, wherein the generating comprises generating the code by classifying each type of the first multiplication result values according to the bit type of the weight and the input value.

8. The computation method of claim 7, wherein the generating comprises:
    performing a first classifying operation of classifying whether the result value is 0 (zero) for the first multiplication;
    performing a second classifying operation of classifying the type of the remaining result value for each first multiplication wherein the result value is classified to be not 0 (non-zero); and
    generating the code based on the classified result in the second classifying operation.

9. The computation method of claim 8, wherein the performing the second classifying operation comprises:
    classifying the type of the result value into two groups based on the most significant bit of the weight and the input value for each first multiplication classified as the non-zero; and
    classifying the type of the result value for the first multiplication belonging to each group for the two groups.

10. The computation method of claim 1, wherein classifying result values further comprises:
    classifying each type of the first multiplication result values into a plurality of data according to its repetition probability;
    selecting the first operation method for the first multiplication result values belonging to first data;
    selecting the second operation method for performing a multiply-accumulate operation different from the first operation method for the first multiplication result values belonging to second data having a pre-defined lower repetition probability than the first data; and
    accumulating result values of the first operation method and the second operation method.

11. A multiply accumulator for a deep learning neural network operation, the multiply accumulator comprising:
    one or more processors configured to:
    classify result values of first multiplications of weights (W) and input values (A) according to a result value repetition probability, each first multiplication result value comprising a type of a plurality of types which represent constant values;
    select between a first operation method and a second operation method based on the classified multiplication result values;

the first operation method comprising:
- generating, using an encoder, one-hot encoding codes according to each type of first multiplication result values from the first multiplications;
- determining, using a pop counter, pop-counts for each generated code of the one-hot encoding codes; and
- performing, with a multiply-accumulate operation circuit, a second multiplication between each type of the first multiplication result values and each count value of the pop-counts, wherein each type of the first multiplication results values is a different constant value;

the second operation method comprising:
- performing the first multiplications by applying the weights and input values to at least one multiplier circuit of a multiply-accumulate hardware.

12. The multiply accumulator of claim 11, wherein the multiply-accumulate operation processor derives the second multiplication result value based on a constant multiplier that performs a multiplication operation between the constant value and the count value, or a shifter that performs a shift for a bit of the constant value.

13. The multiply accumulator of claim 12, wherein the multiply-accumulate operation processor accumulates the second multiplication result values based on an adder tree that performs an accumulation operation between the second multiplication result values.

14. The multiply accumulator of claim 11, wherein the multiply-accumulate operation processor derives the second multiplication result values based on a lookup table in which the second multiplication result values are stored.

15. The multiply accumulator of claim 11, wherein the multiply-accumulate operation processor accumulates the second multiplication result values by performing distributed arithmetic based on a lookup table in which the second multiplication result value is stored.

16. The multiply accumulator of claim 11, wherein the encoder generates the code by classifying each type of the first multiplication result values according to the bit type of the weight and the input value.

17. The multiply accumulator of claim 11, wherein the encoder firstly classifies whether the result value is 0 (zero) for each first multiplication, secondly classifies the type of the result value for each first multiplication whose result value is classified to be not 0 (non-zero), and generates the code based on the secondly classified result.

18. The multiply accumulator of claim 17, wherein the encoder classifies the type of the result value into groups based on the most significant bit of the weight and the input value for each first multiplication which is classified to be the non-zero while secondly classifying, and then classifies the type of the result value for the first multiplication belonging to each group.

19. The multiply accumulator of claim 11, further comprising:
- a first operation processor for including the encoder, the pop counter, and the multiply-accumulate operation processor, respectively, and selecting the first operation method for processing the first multiplication belonging to first data;
- a second operation processor for selecting the second operation method for performing a multiply-accumulate operation different from the first operation method of the first operation processor for the first multiplication result values belonging to second data having a lower repetition probability than the first data; and
- a third operation processor for accumulating the result values of the first operation processor and the second operation processor.

20. An electronic device for performing an inference operation of a deep learning neural network, the electronic device comprising:
- a memory configured to store weights (W) of the deep learning neural network and input values (A) that are input to an input layer of the deep learning neural network; and
- a processor configured to:
- classify result values of first multiplications of weights (W) and input values (A) according to a result value repetition probability, each first multiplication result value comprising a type of a plurality of types which represent constant values;
- select between a first operation method and a second operation method based on the classified multiplication result values;

the first operation method comprising:
- determining an accumulated result value for the first multiplications between the weights and the input values that are stored in the memory;
- generating, using an encoder, one-hot encoding codes according to each type of first multiplication result values for the first multiplications, respectively;
- determining, using a pop counter, pop-counts for each generated code of the one-hot encoding codes; and
- performing, with a multiply-accumulate operation circuit, a second multiplication between each type of the first multiplication result values and each count value of the pop-counts, wherein each type of the first multiplication results values is a different constant value;

the second operation method comprising:
- performing the first multiplications by applying the weights and input values to at least one multiplier circuit of a multiply-accumulate hardware.

* * * * *